United States Patent [19]
Stanley et al.

[11] Patent Number: 5,468,179
[45] Date of Patent: Nov. 21, 1995

[54] APPARATUS AND METHODS FOR PREPARING LOAF SHAPED SAUSAGE PRODUCTS IN SLACK FILLED FOOD CASINGS

[75] Inventors: Thomas R. Stanley, Georgetown, Ill.; Mark D. Kelley, Kansas City, Mo.

[73] Assignee: Teepak, Inc., Westchester, Ill.

[21] Appl. No.: 23,410

[22] Filed: Feb. 26, 1993

[51] Int. Cl.⁶ .............................. A22C 7/00; A22C 11/02
[52] U.S. Cl. ............................................. 452/37; 452/174
[58] Field of Search ................................ 452/37, 32, 174

[56] References Cited

U.S. PATENT DOCUMENTS

| | | | |
|---|---|---|---|
| 3,148,408 | 9/1964 | Good | 452/37 |
| 3,396,426 | 8/1968 | Ziolko | 452/37 |
| 4,073,039 | 2/1978 | Muller et al. | 17/1 F |
| 4,112,546 | 9/1978 | Muller | 17/49 |
| 4,129,923 | 12/1978 | Hoegger | 17/33 |
| 4,434,527 | 3/1984 | Staudenrausch et al. | 17/33 |
| 4,434,528 | 3/1984 | Niedecker | 17/49 |
| 4,766,645 | 8/1988 | Lamartino et al. | 452/37 |
| 4,809,403 | 3/1989 | Stanley | 17/41 |
| 4,837,897 | 6/1989 | Lamartino | 452/37 |
| 4,980,949 | 1/1991 | Stanley | 452/37 |

FOREIGN PATENT DOCUMENTS

| | | | |
|---|---|---|---|
| 0039755 | 11/1981 | European Pat. Off. | 452/155 |
| 2054441 | 5/1972 | Germany . | |
| 2210054 | 9/1973 | Germany . | |

*Primary Examiner*—Willis Little
*Attorney, Agent, or Firm*—Michael L. Dunn; Howard M. Ellis

[57] ABSTRACT

Product discharge section of a stuffing apparatus for partially filling food casings is equipped with a device for uniformly distributing and reshaping meat emulsions and other foodstuffs from a rounded configuration to other desired shapes, such as loaf style products for use in preparing turkey loaf, ham loaf, etc. Lower receiving conveyor means transport partially filled casings downstream to a wedge shaped slot defined by the lower conveyor and height and angle adjustable overhead belt which during passage extrudes the flowable meat product upstream toward the filling horn for uniformly apportioning and shaping the product before cooking, smoking or other processing. Methods and apparatus are especially useful in eliminating the need for shaping by hand, or use of loaf shaped molds.

16 Claims, 3 Drawing Sheets

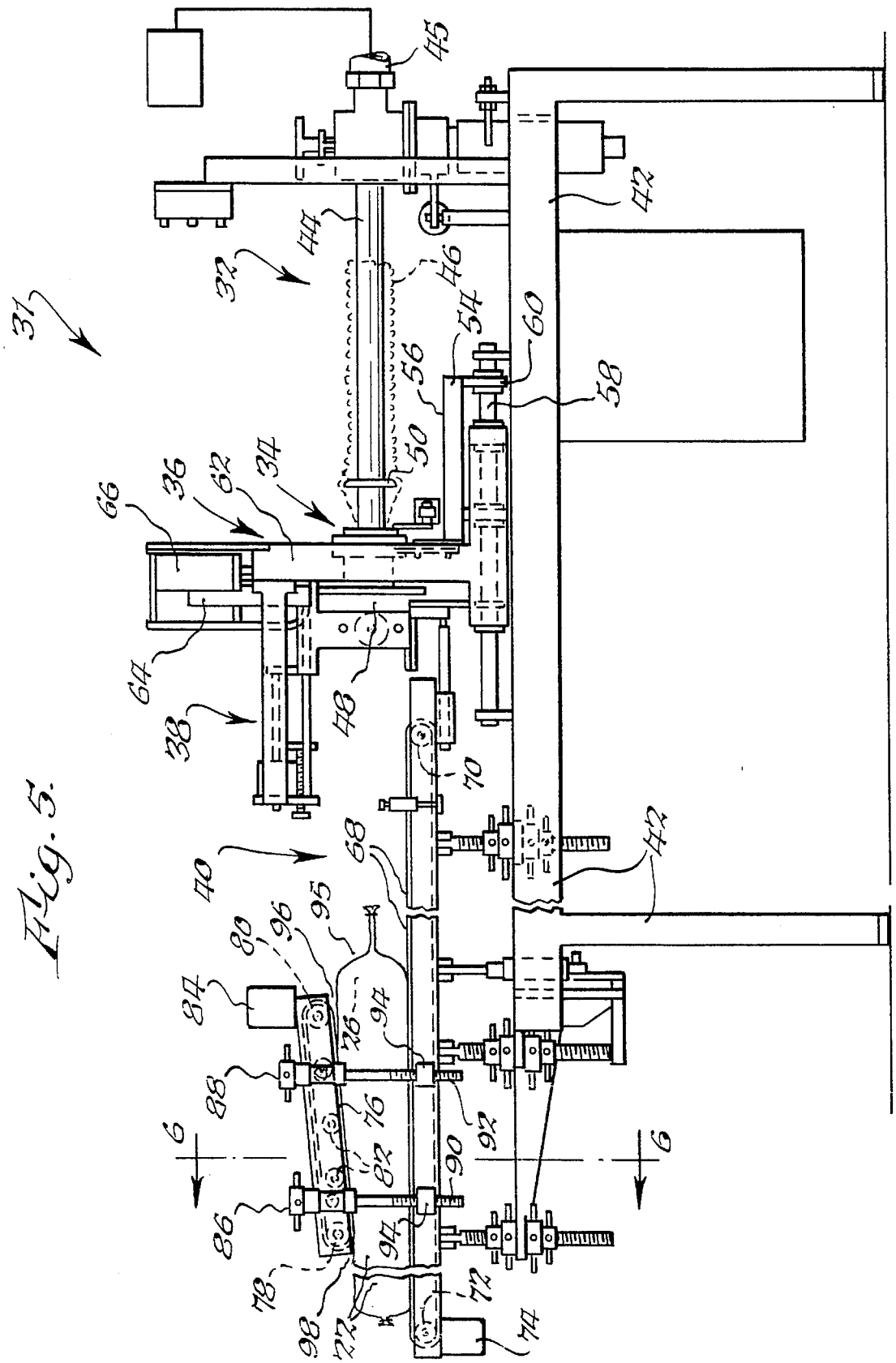

APPARATUS AND METHODS FOR PREPARING LOAF SHAPED SAUSAGE PRODUCTS IN SLACK FILLED FOOD CASINGS

BACKGROUND OF THE INVENTION

This invention relates generally to apparatus and methods for packaging food products, and more specifically, to improved apparatus and methods for preparing partially filled food casings for loaf style meat and sausage products.

In the manufacture of meat and sausage products, it is customary to prepare, for example, a meat emulsion from comminuted meat together with fillers, seasonings, spices, etc. A tubular food casing, such as non-edible cellulose is loaded onto the stuffing horn of a filling machine and stuffed with the meat emulsion. For sausage products like bologna, salami, and the like, the meat emulsion is introduced into large, heavy walled type casings and formed into chubs or lengthy individual sausage sticks having a rounded configuration.

As alternatives to large round shaped meat and sausage products, various apparatus and methods have been proposed for preparing elongated rectangular shaped or loaf style sausage and meat products, e.g. ham loaf, turkey loaf, etc. One specific example relating to means for manufacturing loaf style products is disclosed by U.S. Pat. No. 4,434,528 to Niedecker. Niedecker's method begins with preparation of slack filled casing containing the desired final quantity of meat which is less than the casing's volumetric capacity. A first length of casing is initially filled to capacity with the desired final volume of emulsion. A partially closed clip is applied to the trailing end of the casing, but before being fully closed the filled portion of the casing is compressed between a pair of mechanical jaws to extrude a portion of the emulsion upstream towards the stuffing horn. The pressure simultaneously withdraws additional unfilled casing downstream in the filling direction causing the casing to be drawn through the partially closed clip to form a slack or partially filled casing.

While the methods of Niedecker may be capable of providing satisfactory slacked filled loaf shaped products, they are dependent on the direct application of substantial force by compression means for withdrawing additional casing through a partially closed clip. Unless the casing readily threads through this clip with pressure applied by the mechanical jaws there is an increased statistical risk of casing rupture occurring. This means potentially costly down time for cleanup, lost meat emulsion in the work area, lost production and wasted casings. The methods of Niedecker are also dependent on the separate step of reshaping the slack filled casing into square shaped products by placement into loaf shaped molds.

U.S. Pat. No. 4,980,949 to Thomas R. Stanley discloses an improved apparatus and method for preparing slack filled food casings which effectively reduces the potential risk for casing rupture. This is performed with the aid of a casing slacker system for withdrawing an additional length of unfilled casing from the stuffing horn after the leading end of the casing is filled with a foodstuff, followed by the application of an end closure clip to the trailing unfilled end of the partially filled casing. As a final step in the preparation of a shaped slack filled product Stanley suggests uniformly distributing the meat emulsion into the unfilled portion of the sealed casing manually by the machine operator working the partially filled casing by hand.

While the methods and apparatus of U.S. Pat. No. 4,980,949 offer significant improvements in the preparation of loaf style products the final steps of distributing the meat product throughout the casing and shaping the product manually are not entirely satisfactory. The process does not always result in a consistently uniformly sized product and because it is largely carried out by hand performing this function repeatedly may increase the potential for job related injuries occurring.

German Offenlegungsschrift 2 054 441 published May 10, 1972 describes an apparatus for forming shaped filled sausage casings wherein the casing is underfilled by metering the sausage meat into the casing. The apparatus requires careful metering control and does not redistribute sausage meat from a first filled portion of a casing to a second portion to obtain the desired underfilled condition. In order for the apparatus to properly function, the speed of movement of the casing must be carefully synchronized with extrusion of a metered quantity of sausage meat.

German Offenlegungsschrift 2 210 054 published Sep. 6, 1973 describes an apparatus for forming pairs of skinless sausages by squeezing a roll of sausage meat in a mold formed by a conveyor with side rims. Meat is squeezed to form the start of a pair but a casing is not underfilled and then molded nor is a first region of a casing filled followed by redistributing meat to a second region of the casing.

Accordingly, there is a need for more efficient apparatus and methods of distributing foodstuff in partially filled casings and for shaping into loaf style meat and sausage products without substantial risk of casing rupture and which largely eliminates manual shaping operations.

SUMMARY OF THE INVENTION

It is therefore a principal object of the invention to provide for an apparatus which is suitable for automatically, as opposed to manually, distributing and shaping the foodstuff in food casings having a filled region and an unfilled region, and which is conveniently adaptable for use with apparatus for stuffing partially or slack filled food casings.

In achieving this objective the stuffing apparatus for partially filling tubular food casings may comprise fundamental components like pump means for pressurizing a foodstuff, stuffing horn means for receiving the pressurized foodstuff from the pump means and for delivering to a casing mounted on the stuffing horn means. The casing on the stuffing horn means typically will have first and second undivided interior regions. The foodstuff pumped into the casing is located in the first interior region forward of the second interior region with the second interior region being substantially free of the foodstuff so as to provide a partially filled casing. The stuffing apparatus can also have means for gathering and closing the partially filled casing at terminal ends with leading and trailing end clipping devices known in the art, and appropriate table means for receiving and discharging the product.

The product discharge station of the stuffing apparatus comprises the improved means of this invention for automatically both apportioning the foodstuff between the first and second interior regions of the partially filled casings and for shaping the foodstuff into the desired configuration, e.g. non-rounded or rectangular shaped loaves, generally D-shaped loaves, etc. Table means for receiving and discharging product from the stuffing apparatus include lower conveyor means for receiving and transporting closed, partially filled casings downstream from the stuffing horn means, etc., to a continuous overhead belt means for engaging the upper portion of the partially filled casings moving on the lower conveyor means. The overhead belt means which is movable with and spaced from the lower conveyor means has a product inlet end and a product outlet end, and means for positioning the overhead belt means in a plane which is non-parallel with the lower conveyor means.

Preferably, the overhead belt means is inclined at an angle at the product inlet end and spaced sufficiently above the lower conveyor means to allow entry of the partially filled casing leading with the terminal end having the filled first interior region. The partially filled casing is advanced through this wedge shaped passage causing a portion of the foodstuff in the filled first interior region to be extruded upstream to the adjoining second interior region of the casing to evenly distribute the foodstuff throughout the slack filled casing. The overhead conveyor means can also be shaped to provide loaves with practically any desired configuration, such as loaves having an oval dome or sectionally D-shaped configuration.

Accordingly, it is yet a further object of the invention to provide apparatus which is suitable for simultaneously apportioning and shaping the foodstuff in slack filled casings.

It is still a further principal object of the invention to provide an improved apparatus with means for preparing partially filled food casings with reduced risk of casing rupture in combination with mechanical means for simultaneously distributing and shaping the foodstuff in the casings into loaf shaped products. The improved combination apparatus comprises pump means for pressurizing a foodstuff, stuffing horn means for receiving the pressurized foodstuff from the pump means and for delivering to casing mounted on the stuffing horn means. The casings have a first undivided interior region for filling with the foodstuff and a second undivided interior region as a continuation of the first interior region substantially free of foodstuff. The apparatus includes means for withdrawing the second length of the required final length of casing to form a partially filled casing without applying compressive forces to the filled portion. The apparatus also comprises means for gathering and closing the partially filled casings at their terminal ends.

The combination apparatus employs discharge table means for apportioning the foodstuff evenly between the first undivided interior region and the second undivided interior region of the partially filled casings, and comprises lower conveyor means for receiving and transporting the closed partially filled casings downstream from the stuffing horn means, and continuous overhead belt means for engaging the upper portion of the partially filled casings at the portion having the first undivided interior region. The overhead belt means is movable with and spaced from the lower conveyor means and has a product inlet end and a product outlet end, and means for positioning the overhead belt means in a plane which is non-parallel with the lower conveyor means.

Thus, the overhead belt means spaced sufficiently above the lower conveyor means can be inclined at an angle relative to the lower conveyor means for ease of entry of the partially filled casing leading with the terminal end having the filled first interior region. As the closed partially filled casing is advanced between the overhead belt means and lower conveyor means the gradual reduction in the dimension of the passage results in a portion of the foodstuff from the first interior region being extruded upstream to the previously empty second interior region while simultaneously conforming the product into the desired loaf configuration. That is, the foodstuff becomes uniformly distributed between the first and second interior regions of the slack filled casing while also being formed into a loaf shaped product for further processing, e.g. cooking, smoking, slicing, etc.

It is yet a further object of the invention to provide a method for partially filling food casings in the preparation of a loaf style foodstuff, such as meat and sausage products by the steps of:

(a) loading a stuffing horn at a filling station with a food casing having a leading first end and a trailing second end, the first end being sealed;

(b) withdrawing a first portion of a required final length of casing from the stuffing horn by filling a leading first interior region of the first portion with a foodstuff adjacent to the first sealed end;

(c) withdrawing a second portion of the required final length of casing from the stuffing horn to provide a trailing second interior region substantially free of the foodstuff, the trailing second interior region being a continuation of the leading first interior region;

(d) sealing the second end of casing to form a partially filled and sealed casing, and (e) reshaping the foodstuff in the partially filled and sealed casing by extruding upstream in the direction of the stuffing horn to uniformly distribute in both the first and second interior regions by transporting longitudinally through a narrowing slot.

DESCRIPTION OF THE DRAWINGS

For a further understanding of the invention as well as its characterizing features reference should now be made to the following detailed description thereof taken in conjunction with the accompanying drawings, wherein:

FIG. 5 is a side elevational view of a stuffing machine of the invention equipped with mechanical means for distributing and shaping a slack filled food casing into a uniform loaf style meat or sausage product;

DETAILED DESCRIPTION OF THE INVENTION

Figure 1:
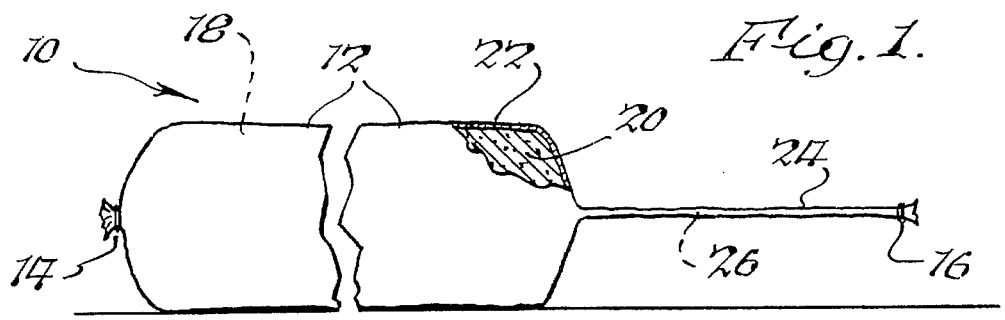
FIG. 1 is a side elevational view of a partially filled food casing with a portion of the outer casing broken away.

Turning first to FIG. 1, there is shown an encased partially filled food package 10 comprising a meat emulsion 20. In most instances, package 10 has a circular cross-sectional configuration (not illustrated). The outer food casing 12 is usually a non-edible food grade film, either a heavy walled nonfibrous film or a fibrous reinforced film, for example. For larger diameter products as contemplated herein heavier walled food casings typically comprising cellulose are preferred although other well known food grade films are also satisfactory. Each end of the partially filled product 10 has a closure. The leading end or first filled portion 18 of casing 12 is shown with a metal clip 14 affixed thereto in the conventional manner, and the trailing end or second unfilled portion 24 with a metal or equivalent chub clip 16.

Initially, first portion 18 of casing 12 holds virtually all of the meat emulsion 20 in first interior region 22 which is shown filled to capacity, whereas second interior region 26 which is a continuation of the first interior region is virtually free of emulsion and air, as shown by the collapsed appearance.

Figure 2:
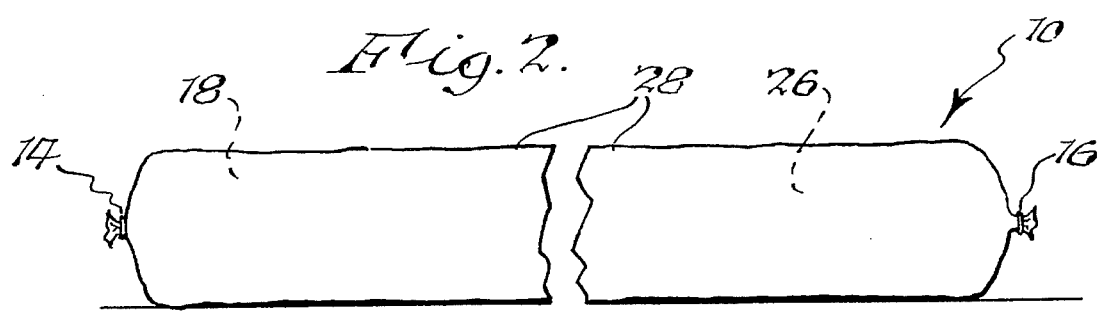
FIG. 2 is a side elevational view of the partially filled or slack filled food casing of FIG. 1 after the foodstuff has been evenly distributed and shaped in the closed casing.

Compared to the partially filled casing of FIG. 1 in which emulsion 20 is initially concentrated in first interior region 22, FIG. 2 illustrates a generally expanded, but also loosely filled casing 28 after meat emulsion 20 is evenly distributed between the first and second interior regions. Because the first interior region is substantially fully expanded with meat emulsion or other foodstuff as illustrated by FIG. 1, subsequent apportionment of the same quantity of emulsion between the first and second interior regions provides for a longitudinally expanded food casing which is loose or slack filled.

Figure 3:
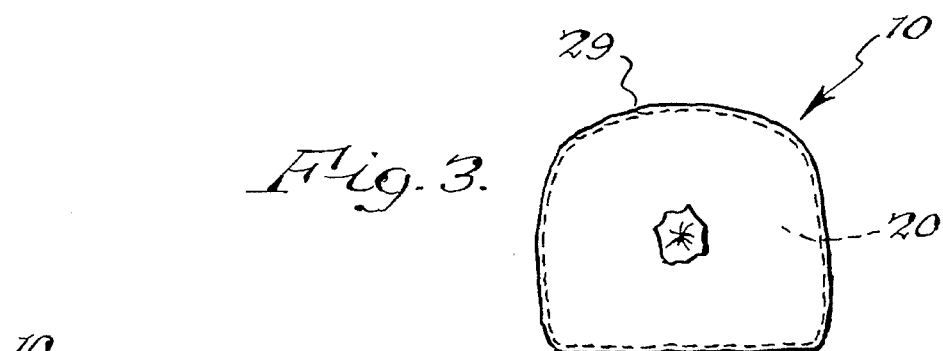
FIG. 3 is an end view of the distributed and shaped food casing taken along line 3—3 of FIG. 2, showing the generally D-shaped configuration.
Figure 4:
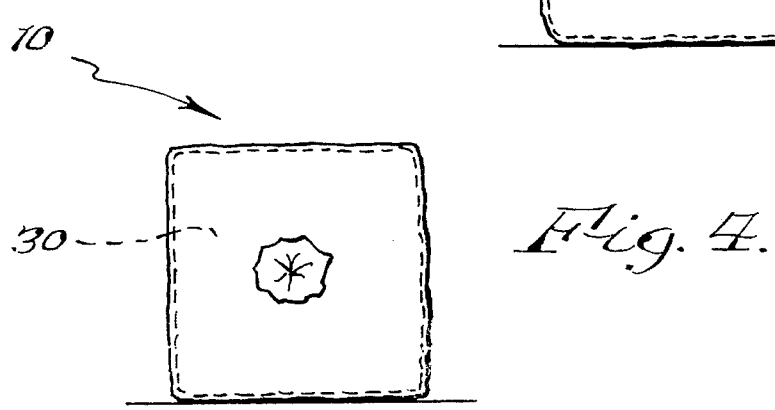
FIG. 4 is an end view of a further loaf style food product having a generally rectangular cross-sectional configuration.

As previously mentioned, one principal object of this invention is to provide not only improved means for apportioning foodstuff between the first and second interior regions of partially filled casings, but also provide the apparatus and methods for shaping the foodstuff in the casings into the desired configuration, e.g. non-rounded, generally loaf shaped products. In this regard, one preferred embodiment of such loaf shaped products is shown in FIG. 3 with the meat product 28 having a generally D-shaped configuration with an oval dome 29. Loaf-shaped products may also take the form shown in FIG. 4, wherein the configured meat 30 is generally rectangularly shaped. This is inclusive of substantially square shaped products and products with adjacent sides of unequal length.

For purposes of the present invention, the apparatus and methods of making slack filled packaged products like those of FIGS. 1–4 will be illustrated with reference to the food stuffing apparatus and methods disclosed in U.S. Pat. Nos. 4,709,450 and 4,773,128, both to Thomas R. Stanley et al, the contents of which are incorporated-by-reference herein. While the apparatus and methods described in the above patents are intended for preparing dimensionally uniform filled products, it is to be understood that the methods and apparatus for preparing encased, slacked filled products as disclosed herein are not restricted or intended to be limited only for use in conjunction with such sizing methods or equipment, but may be utilized with a broad range of filling machines and methods. This would include in particular U.S. Pat. No. 4,980,949, also to Thomas R. Stanley, relating specifically to apparatus and methods of preparing slack filled food casings, the contents of which is also incorporated-by-reference herein.

Slack filled food casings like those of FIG. 1 may be prepared with stuffing apparatus 31 (FIG. 5) consisting of principal stations for: food delivery 32, product sizing 34, casing closing 36, casing slacker 38, and distributing and shaping 40 foodstuff in slack filled casings. All such stations may be mounted integrally into an apparatus on table support 42.

Food delivery station 32 is intended for transporting a pressurized foodstuff, e.g. meat emulsion, cheese product, etc., to casing 46 mounted on filling horn 44. This is achieved with a food pump of conventional design which is interconnected to filling horn 44 at inlet end 45 for delivery of the pressurized foodstuff to horn outlet 48 and into casing 46. Typically, the casing employed is in the form of a pleated strand or precut length of unshirred fibrous or non-reinforced heavy walled tubular material. Filling horn 44 may also be equipped with a presizing ring 50 on the horn shaft for purposes of aiding in deshirring and diametrically stretching the casing before being filled, and for more optimal circumferential size control during the stuffing cycle.

Filling apparatus 31 may also be equipped with a sizing station 34 for controlling product diameter and uniformity. Suitable representative sizing devices include inter-alia those disclosed in U.S. Pat. Nos. 4,709,450 and 4,773,128. Other known sizing devices comprising brake assemblies for engaging unfilled casing on the filling horn for effectively controlling the rate of release of casing during filling for a high degree of product uniformity may also be employed. However, the casing brake assemblies disclosed in detail in U.S. Pat. Nos. 4,709,450 and 4,773,128, are generally preferred. Such devices are supported by a motor driven (not shown), axially translatable carriage assembly 54 which includes a platform 56 slidably mounted on spaced parallel rails 58 affixed to table 42 which pass through rail bushings in platform legs 60. Carriage assembly 54 also includes parallel vertical supports 62 for supporting components of casing closing station 36 and casing slacker station 38. Accordingly, the carriage assembly provides both supporting means and means for simultaneous axial translation of casing sizing, product closing and slacking stations.

Product closing station 36 may include adjacent clipper devices 64 and 66 mounted to carriage assembly 54 through vertical supports 62 for translation along the axis of the filling horn. Such clipper devices are commercially available from Tipper Tie, Inc., Apex, N.C. The first clipper 64 is the chub clipper which compresses the trailing end of a filled casing, gathers the casing of the compressed end of the filled product and applies an end-closure clip thereto. The second clipper 66 adjacent to the filling horn outlet 48 is the horn clipper which gathers the attached leading end of unfilled casing, applies an end-closure clip to prepare the next adjacent unfilled casing on the filling horn for stuffing. A mechanical knife (not shown) positioned between the clippers is actuated to sever the casing between the chub and horn clips.

However, before the casing closing station 36 is actuated to close the filled casing by applying a chub clip, slacker station 38 is actuated. The primary function of the slacker station is to withdraw the trailing second portion 24 (FIG. 1) of unfilled casing from filling horn 44. Details of the casing slacker mechanism are disclosed in U.S. Pat. No. 4,980,949. The device comprises inter-alia co-acting slidably mounted motor driven gates for gathering, compressing, closing and gripping the trailing end of the filled first portion 18 of casing 12, and includes means for moving downstream this first filled portion away from casing closing station 36. This action withdraws an additional preset length of unfilled casing 24 without risk of rupturing or tearing the film for application of clip 16, and for severing from the trailing length of casing remaining on the stuffing horn.

As previously discussed, the apparatus of FIG. 5 may be used in preparing partially filled casings of the type illustrated in FIG. 1. Station 40 also serves as the product discharge section of the apparatus for receiving and transporting such partially filled casings from prior stations upstream, and for distributing and shaping the foodstuff in the casings into products of the type illustrated in FIGS. 2–4.

Station 40 consists of a lower continuous conveyor 68 in the form of a continuous belt mounted on pulleys 70 and 72, which conveyor is driven by motor means 74. Conveyor 68 first receives and transports closed, partially filled casings from the filling horn, slacker sections, etc., to an overhead belt 76 which is spaced above lower continuous conveyor 68. The overhead belt is positioned proximate to the terminus of the lower powered conveyor. Belt 76 is also a continuous conveyor mounted on end pulleys 78 and 80, and supported by intermediate rollers 82. Belt 76 may be powered by its own motor 84, or by motor 74 using conventional motor transmission means (not shown).

Importantly, the overhead belt is fully adjustable for modifying both height and angle relative to lower conveyor 68, the latter of which in most instances is positioned parallel with supporting table 42. For maximizing adjustability, the overhead belt assembly can be supported by independently adjustable brackets 86 and 88 which may be in the form of threaded locking bolts 90 and 92 which mesh with stationary blocks 94 fixedly mounted to the side wall of the lower conveyor section. Brackets 86 and 88 permit adjustment of the height of the overhead belt from lower conveyor 68, and correspondingly, the height of the loaf shaped product by turning locking bolts 90 and 92 either clockwise or counter clockwise.

Preferably, the overhead belt is inclined at an angle relative to the level lower continuous conveyor 68 so it is non-parallel with the lower conveyor. A gradual narrowing product slot 95 is formed beginning with the wider inlet end 96 and concluding with final desired smaller dimension at the product outlet end 98. Hence, product slot 95 is conveniently wedge shaped to allow easy entry of the leading first filled portion 18 (FIG. 1) of partially filled casing 10 into wider inlet end 96. As the lower conveyor and upper belts draw the partially filled casing into product slot 95 meat emulsion, for example, is extruded upstream from the first interior region 22 into the second interior region 26 of the empty portion of the casing to reshape the rounded meat emulsion into an evenly apportioned generally loaf shaped product 28 (FIG. 2). Thus, the continuous overhead belt 76 may be inclined at an angle from inlet end 96 to outlet end 98 of less than about 45° from the horizontal, and more specifically at an angle of from about 3° to less than about 45°.

Figure 6:
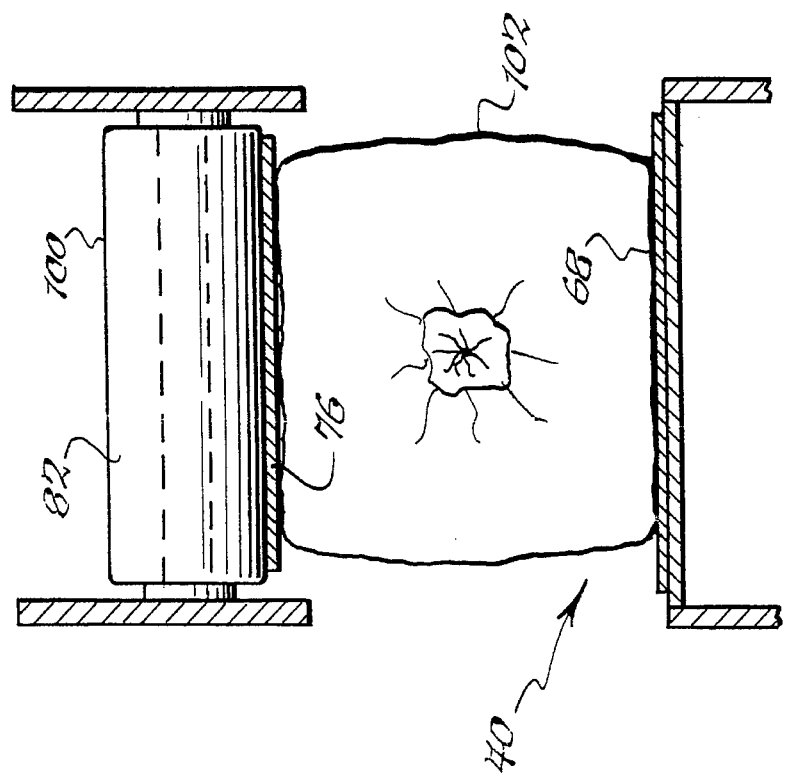
FIG. 6 is an end sectional view of a partially filled casing being formed into a rectangular loaf shaped sausage product with a flat shaped overhead conveyor while being moved on a lower conveyor taken along line 6—6 of FIG. 5.

FIG. 6 illustrates one embodiment of overhead belt 76 which is substantially flat, and which is supported by intermediate rollers 82 also having a continuous straight cylindrical surface 100. It will be apparent to those skilled in the art that alternatives to intermediate rollers 82 can be employed with continuous straight surfaces, such as a supporting back plate member extending the length and width of belt 76. The flattened configuration of overhead belt 76 is suitable for imparting a generally rectangular loaf shape to meat product 102.

Figure 7:
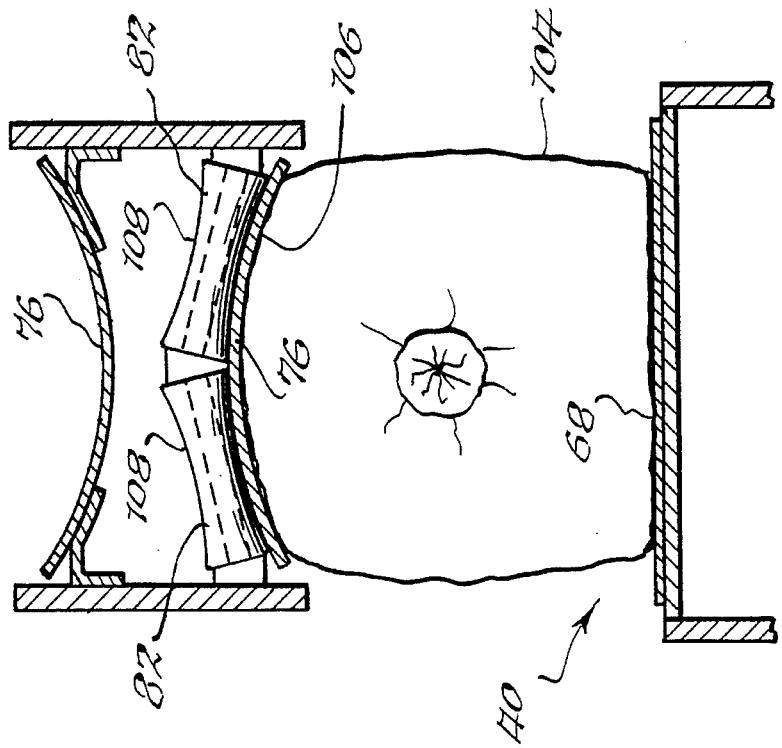
FIG. 7 is an end sectional view of a partially filled casing being formed into a generally D-shaped loaf style sausage product with an oval shaped overhead conveyor while being moved on a lower conveyor.

FIG. 7 provides a further alternative embodiment of distributing and shaping station 40 especially adapted for preparing loaf shaped meat products 104 with an oval dome 106, comparable to a loaf of bread. Overhead belt 76 is sectionally concave for impressing an oval configuration to dome 106. Belt 76 can be supported, for example, by dual intermediate rollers 82 having concave surfaces 108.

Although the invention has been described in considerable detail with respect to the preferred embodiments thereof, it will be apparent that the invention is capable of numerous modifications and variations to those skilled in the art without departing from the spirit and scope of the invention as defined in the appended claims.

What is claimed is:

1. An apparatus for filling tubular food casings comprising in combination pump means for pressurizing a meat emulsion, stuffing horn means for receiving the pressurized meat emulsion from said pump means and for delivering to a first interior region of a casing mounted on the stuffing horn means, said casing having first and second undivided interior regions, said meat emulsion being located in said first interior region while maintaining said second interior region substantially free of said meat emulsion so as to provide a partially filled casing, means for gathering and closing said partially filled casing at terminal ends thereof, means for automatically uniformly distributing and shaping the meat emulsion in both regions of the partially filled casing, and means associated with the closing means and with the distributing means which causes the closing means to close the casing before the distributing means uniformly distributes the meat emulsion and wherein the means for automatically distributing and shaping the meat emulsion comprises discharge table means for engaging and evenly distributing the meat emulsion in said partially filled casing, said discharge table means comprising lower conveyor means for transporting said closed, partially filled casing downstream from said stuffing horn means, and continuous overhead belt means for engaging the upper portion of said partially filled casing moving on said lower conveyor means, said overhead belt means being movable with and spaced from said lower conveyor means and having a product inlet end and a product outlet end, and means for positioning said overhead belt means in a plane which is nonparallel with said lower conveyor means, said overhead belt means and said lower conveyor means being configured to distribute the meat emulsion into the form of a loaf.

2. The filling apparatus of claim 1 wherein said overhead belt means is inclined at an angle and spaced sufficiently above said lower conveyor means to allow entry of the partially filled casing leading with the terminal end having the filled first interior region and to extrude foodstuff upstream to said second interior region to evenly distribute and shape the foodstuff in both regions.

3. The filling apparatus of claim 1 wherein said continuous overhead belt means is inclined at an angle from the inlet end to the outlet end of less than about 45° from the horizontal.

4. The filling apparatus of claim 3 wherein said continuous overhead belt means is inclined at an angle of from about 3° to less than about 45°.

5. The filling apparatus of claim 1 wherein said continuous overhead belt means is substantially flat.

6. The filling apparatus of claim 1 wherein said continuous overhead belt means is generally oval shaped.

7. An apparatus for filling tubular food casings comprising in combination, pump means for pressurizing a foodstuff, stuffing horn means for receiving the pressurized foodstuff from said pump means and for delivering the foodstuff to casing mounted on said stuffing horn means, said casing having a first undivided interior region for filling with said foodstuff, means for withdrawing a second length of the required final length of casing to form a partially filled casing with a second undivided interior region as a continuation of said first interior region substantially free of foodstuff, means for gathering and closing said partially filled casing at terminal ends thereof, and discharge table means for evenly distributing the foodstuff in said partially filled casing, means associated with said means for closing and with said means for distributing which causes the casing to be closed prior to evenly distributing the foodstuff in the casing, said discharge table means comprising lower conveyor means for transporting said closed, partially filled casing downstream from said stuffing horn means, and continuous overhead belt means for engaging the upper portion of said partially filled casing moving on said lower conveyor means, said overhead belt means being movable with and spaced from said lower conveyor means and having a product inlet end and a product outlet end, and means for positioning said overhead belt means in a plane which is non-parallel with said lower conveyor means, the lower conveyor means and overhead belt means being configured so that the foodstuff is distributed in the form of a loaf.

8. The filling apparatus of claim 7 wherein said overhead belt means is inclined at an angle and spaced sufficiently above said lower conveyor means to allow entry of the partially filled casing leading with the terminal end having the filled first interior region and to extrude foodstuff upstream to said second interior region to evenly distribute and shape the foodstuff in both regions.

9. The filling apparatus of claim 7 wherein said continuous overhead belt means is inclined at an angle from the inlet end to the outlet end of less than about 45° from the horizontal.

10. The filling apparatus of claim 7 wherein said continuous overhead belt means is inclined at an angle of from about 3° to less than about 45°.

11. The filling apparatus of claim 7 wherein the shape of said continuous overhead belt means is substantially flat.

12. The filling apparatus of claim 7 wherein the shape of said continuous overhead belt means is generally oval.

13. A method of filling a food casing, which comprises the steps of:

(a) loading a stuffing horn at a filling station with a food casing having a leading first end and a trailing second end, said first end being sealed;

(b) withdrawing a first portion of a required final length of casing from said stuffing horn by filling a leading first interior region of said first portion with a meat emulsion;

(c) withdrawing a second portion of the required final length of casing from said stuffing horn to provide a trailing second interior region substantially free of meat emulsion, said trailing second interior region being a continuation of the leading first interior region;

(d) sealing the second end of said casing to form a partially filled and sealed casing, and (e) automatically reshaping the meat emulsion in said partially filled and sealed casing to uniformly distribute the meat emulsion in both the first and second interior regions by extruding upstream in the direction of said stuffing horn, wherein the meat emulsion is automatically reshaped by transporting the partially filled casing longitudinally through a gradually narrowing slot.

14. The method of claim 13 wherein the step of reshaping the partially filled and sealed casing is by engaging with continuous upper and lower spaced belt means in which said upper belt means is inclined at an angle and spaced sufficiently above said lower belt means to allow entry of the partially filled casing leading with the terminal end having the filled first interior region and to extrude foodstuff upstream to said second interior region to evenly distribute and shape the foodstuff in both regions.

15. The method of claim 14 wherein the foodstuff comprises a meat based product formed into a generally rectangular loaf-shaped configuration.

16. The method of claim 14 wherein the foodstuff comprises a meat based product having a generally D-shaped loaf configuration.

* * * * *